(12) United States Patent
Cornell et al.

(10) Patent No.: US 9,085,375 B2
(45) Date of Patent: Jul. 21, 2015

(54) AUTOMATED TERMINAL TO AIRCRAFT CONVEYANCE SYSTEM

(76) Inventors: Steven Barrie Cornell, San Diego, CA (US); Peter John Muller, Franktown, CO (US)

( * ) Notice: Subject to any disclaimer, the term of this patent is extended or adjusted under 35 U.S.C. 154(b) by 608 days.

(21) Appl. No.: 13/385,479

(22) Filed: Feb. 22, 2012

(65) Prior Publication Data

US 2012/0211606 A1 Aug. 23, 2012

Related U.S. Application Data

(60) Provisional application No. 61/446,034, filed on Feb. 23, 2011.

(51) Int. Cl.
*B64D 9/00* (2006.01)
*B64F 1/30* (2006.01)

(52) U.S. Cl.
CPC ........................................ *B64F 1/30* (2013.01)

(58) Field of Classification Search
CPC ................ B64F 1/31; B64F 1/32; B64F 1/00; B64F 1/30
USPC ...................................................... 244/137.2
See application file for complete search history.

(56) References Cited

U.S. PATENT DOCUMENTS

| | | | |
|---|---|---|---|
| 3,397,649 A | 8/1968 | Pfeffer | |
| 4,061,089 A | 12/1977 | Sawyer | |
| 6,129,026 A * | 10/2000 | LeCroy | 104/88.01 |
| 6,389,982 B1 | 5/2002 | Evensen | |
| 7,302,319 B2 | 11/2007 | Wu | |
| 7,681,505 B2 | 3/2010 | Lowson | |
| 2004/0162755 A1 | 8/2004 | Muller | |

OTHER PUBLICATIONS

MacDonald, R., Airport Mobility, Nov. 21, 1985, Publication Unknown.
Robinson, J., Personal Rapid Transit Technology—Opportunities for Airport Passenger Terminal Facility Planning, Sixth International Conference on APM, Apr. 9-12, 1997.
Stahmer, J., Moving Forward, Civil Engineering Magazine, Jan. 2011.
Cornell, S., Facilities Optimization Through the Use of a PRT-Enabled Passenger Terminal Solution, Unpublished, Feb. 21, 2012.

* cited by examiner

*Primary Examiner* — Brian M O'Hara

(57) ABSTRACT

One embodiment of an automated system for carrying passengers between airport terminal or concourse facilities and parked aircraft is shown. The embodiment comprises PRT guideways (13, 14, 15, 23, 27), vehicles (21) and stations (22). Some PRT stations are linked to parked aircraft (11) or aircraft parking positions by means of conventional loading bridges (12), while others are linked to terminal or concourse buildings (15). No PRT station is linked to more than one aircraft. Other embodiments are described and shown. The embodiments provide a high level of service while reducing the need to construct terminal or concourse buildings adjacent to each aircraft parking position.

5 Claims, 7 Drawing Sheets

AUTOMATED TERMINAL TO AIRCRAFT CONVEYANCE SYSTEM

CROSS-REFERENCE TO RELATED APPLICATIONS

This application claims the benefit of PPA Application No. 61/446,034 filed 23 Feb. 2011 by the present inventors, which is incorporated by reference.

BACKGROUND

Prior Art

The following is a tabulation of some prior art that presently appears relevant:

U.S. Patents

| Pat. No. | Issue Date | Patentee |
|---|---|---|
| 3,397,649 | Aug. 20, 1968 | Pfeffer |
| 4,061,089 | Dec. 6, 1977 | Sawyer |
| 6,389,982 B1 | May 21, 2002 | Evensen |
| 7,302,319 | Nov. 27, 2007 | Wu |
| 7,681,505 B2 | Mar. 23, 2010 | Lowson |

U.S. Patent Application Publications

| Publication Nr. | Publ. Date | Applicant |
|---|---|---|
| US 2004/0162755 A1 | Aug. 19, 2004 | Muller |

NONPATENT LITERATURE DOCUMENTS

MacDonald, R. *Publication Unknown*, "Airport Mobility" (Nov. 21, 1985)

Robinson, J. *Sixth International Conference on Automated People Movers*, "Personal Rapid Transit Technology—Opportunities for Airport Passenger Terminal Facility Planning" (Apr. 9-12, 1997)

Stahmer, J., *Civil Engineering* magazine, "Moving Forward" (January, 2011)

Cornell, S., *Unpublished*, "Facilities Optimization Through the Use of a PRT-Enabled Passenger Terminal Solution" (Feb. 21, 2012).

The present invention relates generally to personal rapid transit (PRT). More particularly, the present invention relates to systems and methods of utilizing PRT in airport terminal applications. In general, there are presently only four different ways for able-bodied passengers to move from an airport terminal or concourse gate to and from an aircraft. The first prior art method is walking along a passenger loading bridge. This method provides the highest level of service but is by far the most expensive solution because it requires the concourse to be constructed to provide a direct connection to the vicinity of each passenger hold room located in close proximity to an aircraft parking position (aircraft contact gate). However, this method is currently the most utilized, or preferred, solution at most U.S. airports.

The second prior art method is walking across the aircraft parking apron and up aircraft boarding stairs. This method is the least expensive solution and provides the lowest level of passenger service largely because of the stair climbing and walking distances that are involved with reaching and boarding the aircraft or departing the aircraft and walking to the terminal.

The third prior art method is riding a bus or like vehicle across the aircraft parking apron and then walking up aircraft boarding stairs. The third method provides for vehicular transfer of passengers from the terminal to the aircraft, thus allowing the aircraft to be parked more remotely from the building than in the second prior art method. However, the third prior art method continues to require stair climbing, while reducing or eliminating long walking distances.

The fourth prior art method is riding a mobile lounge that "mates" both with the terminal and the aircraft. This method is only known to have been successfully used at one U.S. airport for a number of years and is being taken out of service as a result of being defined as functionally obsolete.

Most non-U.S. airports use a combination of the first, second, and third prior art methods for enplaning (boarding passengers on aircraft leaving an airport) and deplaning (removing passengers from an aircraft arriving at an airport) aircraft. Many non-U.S. airports are currently choosing to sacrifice a high level of passenger service for the cost savings that can be realized by utilizing the second and third prior art methods to enable placing aircraft at locations remote to the terminal building.

Current practice at U.S. airports teaches that the costs and long walking distances associated with the long buildings required to serve the large spaces required to park aircraft with long wingspans adjacent to the buildings are simply accepted as a part of doing business. There are no known studies by the Transportation Research Board's Airport Cooperative Research Program or others to find solutions to this problem which is either not recognized as a problem, or thought to be insolvable. Many airports overseas (and a few in the U.S.) solve this problem by having some remote gates served by buses. This results in their contact gates having a high level of service and their remote gates having a low level of service. Some airports have long loading bridges reaching to aircraft parked beyond the end of a concourse building. However, the length of these bridges is limited to about three times the length of a typical bridge. No airports are known to have connected the non-aircraft end of a loading bridge to anything but a terminal or concourse building. The concept of connecting a loading bridge directly to a transit system is not evident in the prior art.

Current U.S. airport practice also teaches that each loading bridge is coupled with a specific hold room. This makes it difficult to accommodate a varying fleet mix of aircraft with differing wingspans since locations where a loading bridge can be coupled to a terminal or concourse building are restricted to specific portions of specific hold rooms and further restricted by the location of ancillary facilities such as concessions and rest rooms.

A PRT system, as in U.S. Pat. No. 4,061,089 to Sawyer (1977) and U.S. Pat. No. 7,681,505 to Lowson (2010), generally includes a plurality of automated small vehicles coupled to one or more guideways which are in turn coupled to a plurality of stations. Vehicles operate automatically under the control of a computerized control system. Each of the small vehicles typically takes an individual or small group from an origin point to a destination point without any intermediate stops associated with typical transit systems. The vehicles can also be used to transport goods, trash or luggage as is the case in the Masdar City PRT system in Abu Dhabi. PRT vehicles are smaller than conventional airport automated people mover (APM) vehicles and can operate on much narrower guideways. Hence, PRT vehicles can routinely navigate much smaller turning radii, thus providing the ability to efficiently incorporate PRT systems into confined spaces such as an airport terminal. These attributes also enable readily integrating PRT systems with existing and new facilities in a manner that takes the PRT vehicles to the users instead of requiring the user to come to the transit system.

PRT vehicles are generally small and accommodate up to about six passengers. A class of vehicles exists, between PRT and APM in size, called group rapid transit (GRT). In some circumstances GRT vehicles may be better able to accommodate passenger demand than PRT vehicles. In other circumstances, high demand may be best accommodated by platooning two or more PRT vehicles together as described in U.S. Pat. No. 7,302,309 to Wu (2007). The PRT systems in the present invention can include both GRT vehicles and platooned PRT vehicles.

Systems and methods for utilizing PRT in a terminal to aircraft conveyance system have been found to result in unexpected benefits, particularly those systems and methods having (i) direct non-stop service, with little or no waiting, from the passenger processing building to and from individual remotely parked aircraft, (ii) continuous service (e.g., passengers leaving every minute or so) that is located at approximately the level of the aircraft door sill, and (iii) numerous aircraft each receiving individual service by the same PRT system.

As will become apparent, the prior art does not teach or suggest the systems and methods described in this disclosure. Moreover, in some instances the prior art teaches away from the systems and methods described in this disclosure. For example, in Stahmer, et al., *Moving Forward* (January 2011) a system at Washington Dulles International Airport was described that was put in place when the airport opened in 1962. This system utilized vehicles operating on the ramp to access aircraft parked remotely from the terminal. However, in contrast to embodiments of the present invention, these vehicles were very large, manually-operated vehicles called mobile lounges. Stahmer states that the vehicles are now functionally obsolete, providing evidence that even the most recent prior art teaches away from direct aircraft access from the terminal by any mode other than walking or bus.

However, none of the above prior art methods allow passengers from an arriving aircraft to select an immediate destination that differs from the other passengers' destinations. Essentially, all passengers are delivered to a common destination within the terminal or concourse from where each passenger must proceed to his or her own intermediate destinations within the airport. The prior art essentially teaches that passenger conveyance to aircraft is accomplished by having clusters of at least four aircraft parked adjacent to a passenger processing building and providing aircraft access by walking across the apron or through a loading bridge connecting the aircraft to the building. U.S. Pat. No. 3,397,649 to Pfeffer et al (1968), "Airport Mobility" by MacDonald (1985), "Personal Rapid transit Technology—Opportunities for Airport Passenger Terminal Facility Planning" by Robinson et al (1997) and U.S. Patent Application US 2004/0162755 A1 by Muller (2004) all address means to take PRT systems beyond the main terminal to service aircraft parked remotely. All indicate the remotely parked aircraft are clustered around concourse buildings in groups of not less than four and that the PRT systems serve the concourse buildings and not the aircraft directly.

Alternatively, the prior art teaches that aircraft can be parked remotely from the building and passenger access is across the apron—either by bus, mobile lounge, or walking.

DRAWINGS

List of Reference Numerals

Figure 1:
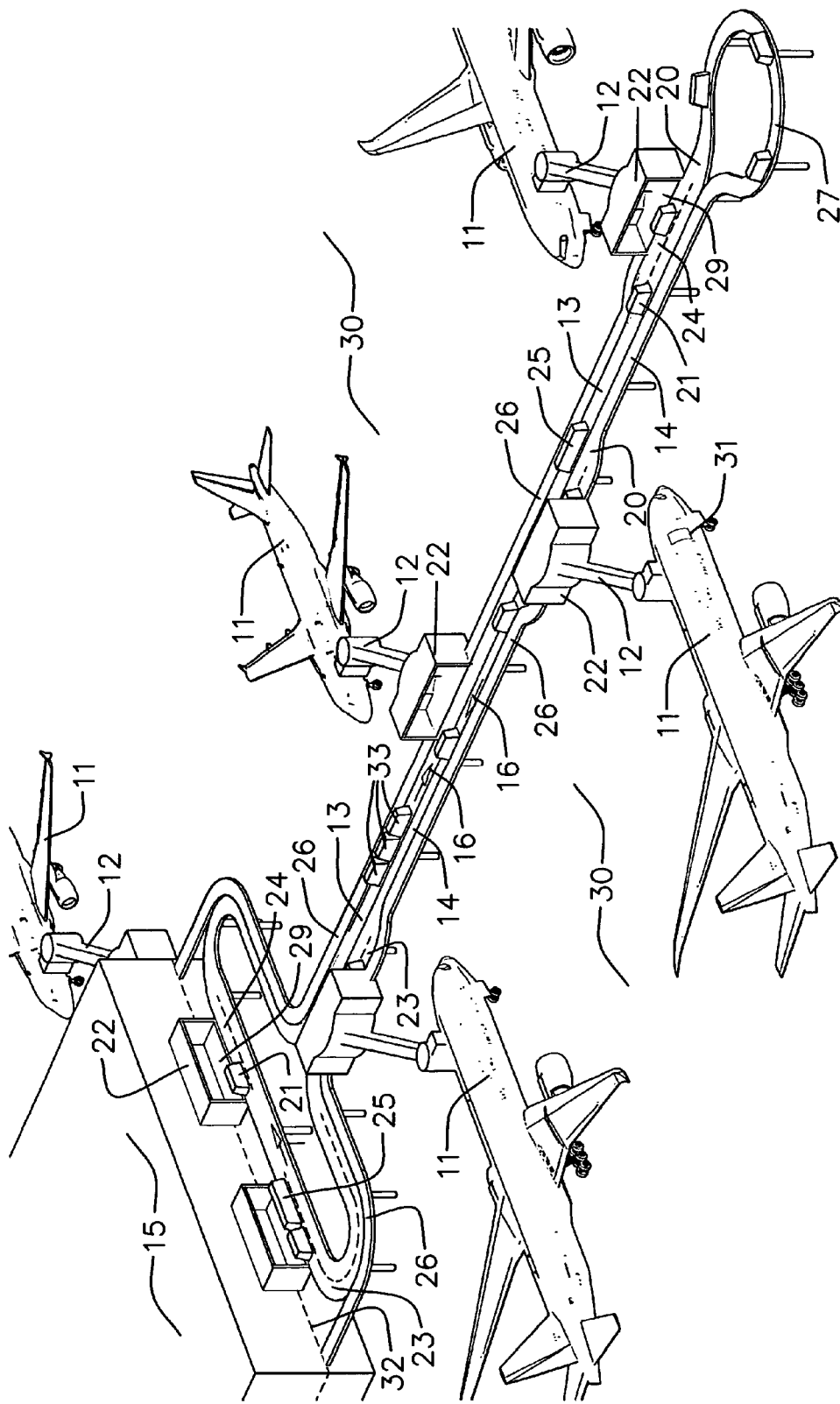
FIG. 1 is an aerial view of an exemplary airport concourse with an integrated PRT system according to a first embodiment.

11. Parked aircraft
12. Aircraft loading bridge
13. Outbound guideway
14. Inbound guideway
15. Concourse or terminal
16. Directional arrow indicating direction of traffic
17. Guideway ramp down
18. Guideway ramp up
19. Intermediate guideway
20. Merge/diverge area
21. PRT vehicle
22. Station
23. Station guideway
24. Station bay
25. GRT vehicle
26. Emergency walkway
27. Guideway return loop
28. Configuration serving only one aircraft with one up and one down ramp only
29. Station platform
30. Aircraft parking apron
31. Aircraft sill level
32. Concourse or terminal floor level
33. Platooned PRT vehicles

SUMMARY OF THE INVENTION

Embodiments of the present invention comprise automated terminal to aircraft conveyance systems and methods by integrating PRT systems with airport terminals or concourses and aircraft loading bridges. The inventive systems and methods minimize the size of the terminal or concourse building and provide a direct connection between the terminal or concourse building passenger hold rooms and aircraft boarding stations serving individual aircraft which are located remotely from the terminal or concourse building. Some embodiments of automated terminal to aircraft conveyance systems include a terminal or concourse building interface and a mostly elevated transfer system from the terminal or concourse to specific aircraft.

As indicated, PRT vehicles are smaller than conventional airport APM vehicles, can operate on much narrower guideways and can routinely navigate much smaller turning radii. Thus, a PRT system can be incorporated into a confined space such as an airport terminal. Additionally, a PRT system can be readily integrated with existing and new airport facilities in a manner that takes the PRT vehicles to the users instead of requiring the user to come to the transit system. In addition, the minimum headway (time between vehicles) of PRT vehicles can be as low as a few seconds as opposed to a few minutes for most other transit systems. These characteristics, among others, make PRT better suited than APM for providing in-concourse service to individual or a small group of aircraft boarding gates. For example, Detroit International Airport's in-concourse APM has three stations serving 62 gates in contrast to a similar exemplary automated terminal conveyance system having each PRT station serving four to eight aircraft gates (as described in patent application US 2004/0162755 A1 by Muller, 2004, August 19) or, as shown herein, each PRT station serving one aircraft.

However, whether by means of APM or PRT, all previously defined concepts for serving aircraft gates with automated vehicles on exclusive guideways required development of a substantial multi-function transfer building to transition the passengers from the aircraft loading bridge to the people mover system. This multi-function transfer building, in addition to facilitating the passenger transition to the people mover system, also facilitates airline check-in functions, passenger waiting and comfort functions and the ability of passengers to walk between gates. Embodiments of the automated terminal to aircraft conveyance system eliminate the need for a multi-function transfer building and connect a multi-function terminal or concourse building directly to aircraft boarding bridges thereby allowing passengers boarding the PRT system to be transported to specific pre-assigned aircraft., consolidating operational functions, reducing the need for circulation space and thus saving time, money and space as well as significantly reducing passenger walking distances as described by Cornell (February, 2012).

As a result, automated terminal to aircraft conveyance systems and methods provide a higher level of service and typically cost less to construct and operate than that of prior art methods.

Advantages

The resulting advantages of embodiments of the automated terminal to aircraft conveyance systems and methods include, but are not limited to:
Shorter trip times
Seated travel
Sheltered travel
Reduced walking distances
Reduced need for handicap assistance
Easier way finding (guidance of passengers within the terminal building)
Reduced costs (compared to concourse construction/expansion)
Reduced footprint (compared to concourse construction/expansion)
Reduced apron severance-airport operating equipment can pass underneath it, facilitating operations (if portions are elevated)
All departing passengers using the system wait in a common area in the terminal/concourse building which promotes improved concession sales
Arriving passengers can be delivered to alternate destinations either specific to each arriving aircraft and/or specific to each arriving passenger
Departing passengers could be delivered to departing aircraft from numerous locations on the airport
No changes in security procedures are required since the system acts like an extension to the loading bridges
Each terminal station bay can be set up to have a specific aircraft as a destination during a specific time period, and check procedures can be identical to those at a conventional hold room gate
Functions such as gate check-in, waiting, comfort facilities and concessions can be consolidated into one area.

Embodiments of the automated terminal to aircraft conveyance system function as a loading bridge extension of almost infinitely variable length while providing a seated ride that keeps walking by aircraft passengers to a minimum. Notably, aircraft passengers can be processed through their final check-in at the gate and proceed to board the PRT vehicle at the same more-or-less steady rate they would be processed through a conventional loading bridge.

Next, the aircraft passengers can then directly travel to and board their specific aircraft at the same steady rate, without intermediate waiting, despite the aircraft being remote from the building by a distance far in excess of that which can be spanned by a conventional loading bridge. The trip from the gate to the aircraft can be accomplished in a few minutes with the amount of walking being limited to the approximate length of a conventional loading bridge. For aircraft passengers arriving at the airport, embodiments of the automated terminal to aircraft conveyance system provide even more benefits than a loading bridge extension because the inventive system allows the flexibility to deliver all passengers from an arriving aircraft to an alternate destination (e.g. customs or baggage claim), or to deliver passengers from an aircraft to a variety of selected destinations (e.g. ancillary facilities such as parking lots, other airport terminals or other aircraft).

In sum, embodiments of the present invention provide systems and methods that incorporate PRT systems with airport terminals to create more efficient and effective automated terminal or concourse to aircraft conveyance systems to provide aircraft passengers with direct non-stop and continuous service to and from the aircraft door and a variety of locations within the airport.

DETAILED DESCRIPTION

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning: either or both.

References in the specification to "one embodiment", "an embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

The term "removable," "removably coupled," "readily removable," "threadably coupled," and similar terms, as used in this specification and appended claims, refer to structures that can be uncoupled from an adjoining structure with relative ease (i.e., non-destructively and without complicated or time consuming process), and can also be readily reattached or coupled to the previously adjoining structure.

Directional and/or relationary terms such as, but not limited to, left, right, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" and "generally" as used herein unless otherwise indicated mean a margin of +−20%. Also, as applicable, the term "substantially" as used herein unless otherwise indicated means a margin of +−10%. Concerning angular measurements, "about" or "generally" refer to +−10 degrees and "substantially" refers to +−5.0 degrees unless otherwise indicated. It is to be appreciated that not all uses of the above terms are quantifiable such that the referenced ranges can be applied.

The term "airport concourse gate" as used in this specification and the appended claims refers to the final location where passengers are processed to allow access to an aircraft. Exemplary Automated Terminal to Aircraft Conveyance Systems and Methods.

In each of the following embodiments, each aircraft (11) may be served by one or more PRT stations (22). However each PRT station, other than those serving the concourse or terminal (15), only serves one aircraft. Thus passengers checked in to board the PRT system at the concourse or terminal can be transported exclusively to the pre-assigned aircraft for their flight. The final preflight check-in process can thus be moved away from the entrance to the passenger boarding bridge to a more centralized situation in the concourse or terminal. Furthermore, this check-in process could be automated such that the PRT system would interpret the scanned boarding pass of the first passenger to board a vehicle to determine the destination station(s) serving the associated specific aircraft. Additional passengers would only be allowed to board this vehicle if they are on the same flight assigned to the same specific aircraft. The vehicle would then proceed directly to a station connected only to the associated specific aircraft. This improved check-in process could allow final check in for any flight at numerous terminal or concourse stations.

First Embodiment

A first embodiment automated terminal to aircraft conveyance system is disclosed herein with reference to FIG. 1. FIG. 1 is an aerial view of an exemplary airport concourse with an integrated PRT system. A plurality of parked aircraft (11) is illustrated. Some of the aircraft are parked at the end of an airport concourse or terminal (15) and removably coupled to the airport concourse or terminal (15) by one or more loading bridges (12). Other aircraft are parked beyond the end of the concourse. An outbound PRT guideway (13) leads from the airport concourse or terminal (15) out between the parked aircraft (11). A guideway return loop (27) is coupled to the outbound PRT guideway (13) and to an inbound PRT guideway (14) leading from between the parked aircraft (11) back to the airport concourse or terminal (15) and then back to the outbound guideway (13). Station guideways (23) are coupled to station bays (24) and the outbound and inbound guideways (13 and 14). A plurality of PRT vehicles (21) are capable of moving and stopping in station bays (24) and on the guideways (13, 14, 23, and 27) under the control of a conventional PRT computer control system which ensures the safe merging and diverging of vehicles (21) in merge/diverge areas (20).

A plurality of PRT stations (22) are coupled to the guideways (13 and 14). Stations may incorporate station guideways (23) allowing PRT vehicles (21) stopped at station to not impede the flow of traffic on guideways (13 and 14). Some stations are removably coupled to parked aircraft by means of conventional aircraft loading bridges (12) while others are coupled to the concourse or terminal (15). The direction of traffic is depicted by arrows (16). Emergency walkways (26) may be provided for use by emergency responders and/or passengers in the event of an emergency or a system failure.

The level of the PRT station platforms (29) coupled to aircraft loading bridges (12) is such as to facilitate walking on the loading bridges (12) coupling an aircraft sill level (31) to the PRT station platform level. This is to say that the PRT station platform (29) level is close enough to the aircraft sill level (31) to avoid the loading bridge (12) being so steep as to impede walking. The level of the PRT station platforms (29) coupled to the concourse or terminal (15) is such as to approximately match the floor level of the concourse or terminal (32). The concourse or floor level adjoining the PRT stations could be any ground, below ground or upper level of the building.

The operation of the embodiment can be similar to the present operation of airport concourse gates and loading bridges. Boarding passengers can be processed through the gate onto a PRT vehicle (21) which takes them to a PRT station (22) along a guideway (13, 14, 27, and/or 23) providing direct access to an aircraft loading bridge (12). Thus the boarding process may be unchanged with the exception that a short ride on a PRT vehicle (21) is inserted between the passenger having his/her boarding pass checked and entering the loading bridge (12). Deplaning passengers similarly have a short ride on a PRT vehicle (21) between the loading bridge (12) and the terminal or concourse (15). Of significant difference is that, instead of an airport concourse gate always being associated with the same loading bridge (12) and aircraft parking position, any gate can be associated with any bridge and its aircraft parking position provided both are coupled to the PRT system. Further, the potential exists for the PRT station (22) or individual station bay (24) to automatically screen boarding passes and thus allow boarding for any aircraft (11) to take place at any terminal or concourse (15) station (22) or station bay (24). In the case of aircraft-to-aircraft transfers it may be advantageous for passengers deplaning one aircraft (11) to proceed directly to another without passing through the terminal or concourse (15) at all.

It is to be appreciated that the configuration shown in FIG. 1 is exemplary only and is not intended to be the only configuration according to disclosed embodiments. The automated terminal to aircraft conveyance system could function with fewer or more loading bridges, PRT stations and station bays. Additionally, it is contemplated that one PRT station could be served by more than one loading bridge. Moreover, the guideway configuration could be altered to suite varying terminal or concourse building layouts and floor elevations, and varying aircraft sizes, parking positions and sill heights. Guideways could be added to increase capacity, provide vehicle storage and/or provide intermediate return loops. In addition one or more of the PRT vehicles could be platooned together and/or replaced with GRT vehicles.

Second Embodiment

Figure 2:
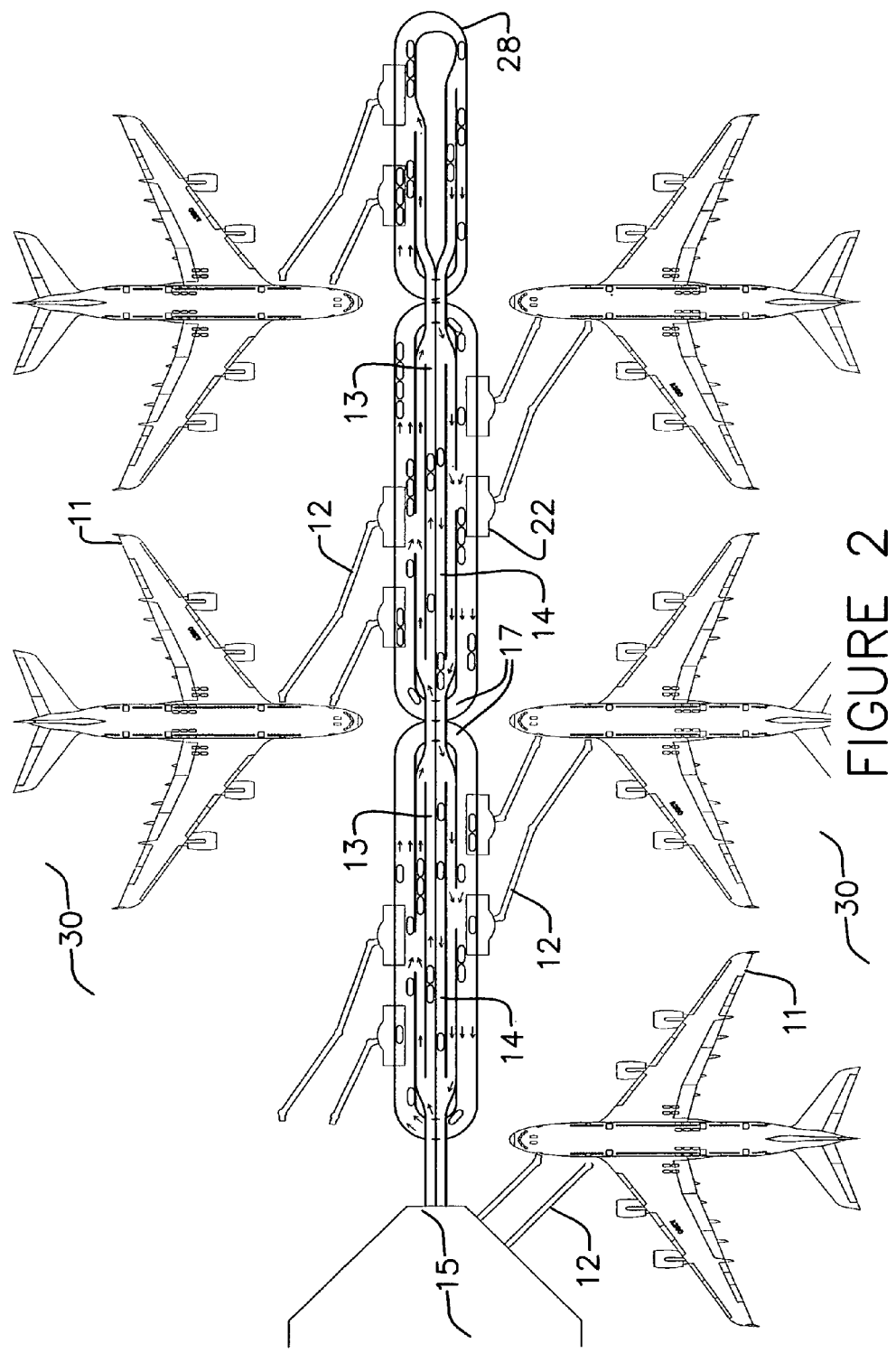
FIG. 2 is an overhead plan view of an exemplary airport concourse with an integrated PRT system according to a second embodiment.
Figure 3:
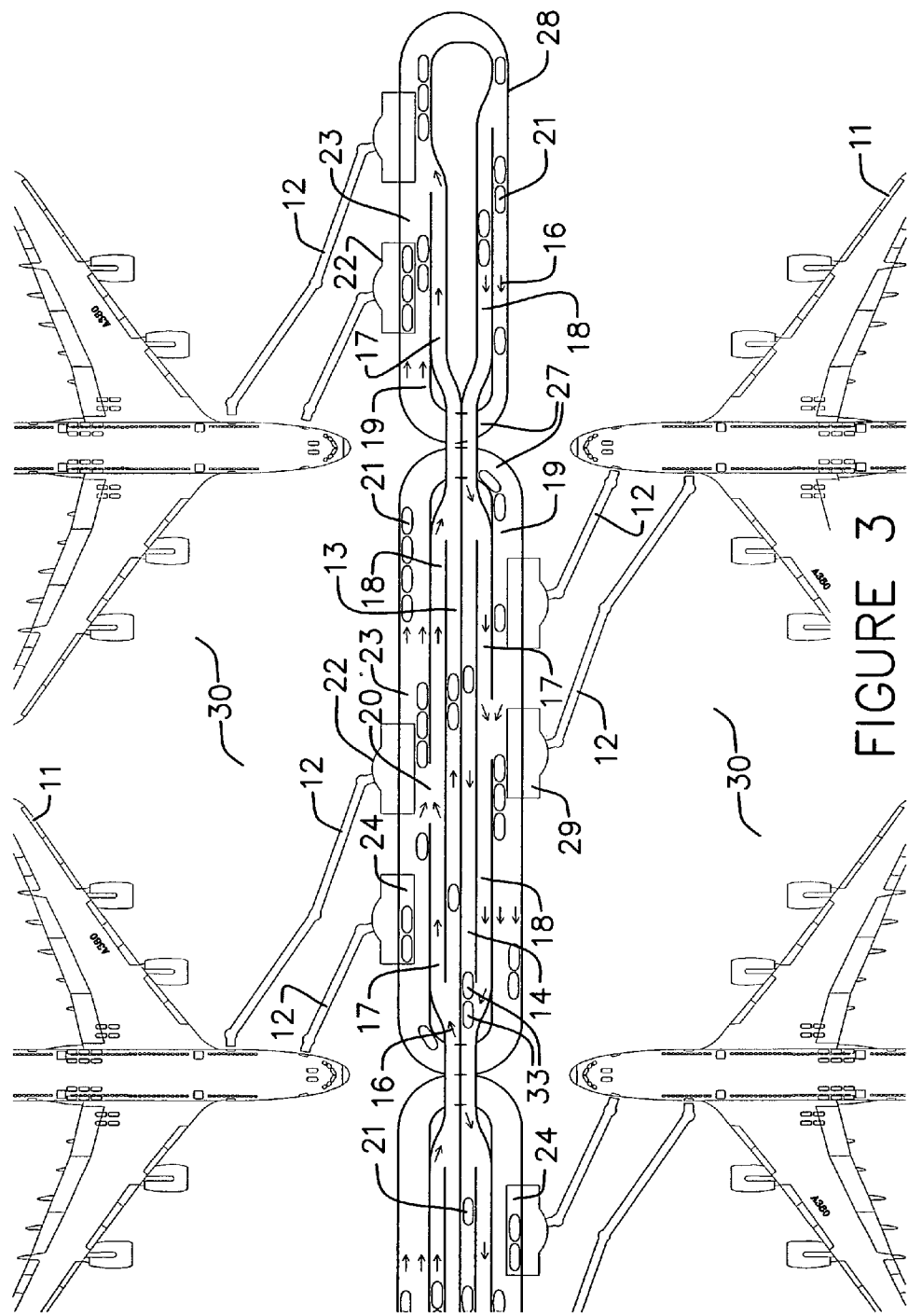
FIG. 3 is a close-up view of the second embodiment airport concourse with an integrated PRT system illustrated in FIG. 2.

A second embodiment automated aircraft to terminal conveyance system is disclosed herein with reference to FIGS. 2 and 3. FIG. 2 is an overhead plan view of an exemplary airport concourse with an integrated PRT system. A plurality of parked aircraft (11) is illustrated. Some of the aircraft are parked at the end of an airport concourse (15) and removably coupled to the airport concourse (15) by one or more loading bridges (12). Other aircraft are parked beyond the end of the concourse. An outbound PRT guideway (13) leads from the airport concourse (15) out between the parked aircraft (11). The outbound PRT guideway (13) is coupled to an inbound PRT guideway (14) leading from between the parked aircraft (11) back to the airport concourse (15).

Now referring to FIG. 3, a close-up view of the second embodiment automated terminal to aircraft conveyance system focusing on an area bounded by four parked aircraft (11) is illustrated. The outbound PRT guideway (13) and inbound PRT guideway (14) are also shown. Both PRT guideways (13, 14) are elevated above the other guideways illustrated; however, other embodiments can have the PRT guideways (13, 14) below or on the same level as the other guideways. The direction of traffic is depicted by arrows (16). Guideways (17) ramp down to a lower level from PRT guideways (13 or 14). Similarly, guideways (18) ramp up from the lower level to PRT guideways (13 or 14). Intermediate guideway (19) is typically at the lower level and forms a generally rectangular loop around guideway ramps (17) and (18) and under PRT guideways (13 and 14).

Still referring to FIG. 3, guideways (17, 18, and 19) are typically all at the lower level in the vicinity of merge/diverge area (20) allowing PRT vehicles (21) to pass from guideways (17) to intermediate guideways (19) and from intermediate guideways (19) to guideways (18). One or more loading bridges (12) lead from the parked aircraft (11) to PRT stations (22) disposed proximal to an outer station guideway (23) attached to and at approximately the same level as lower level guideway (19) such that passage of PRT vehicles (21) to and from lower level guideway (19) and outer station guideway (23) is facilitated. The level of the PRT stations (22) and guideways (19 and 23) is such as to facilitate walking on the loading bridges (12) coupling an aircraft sill level to the PRT station platform.

Third Embodiment

Figure 4:
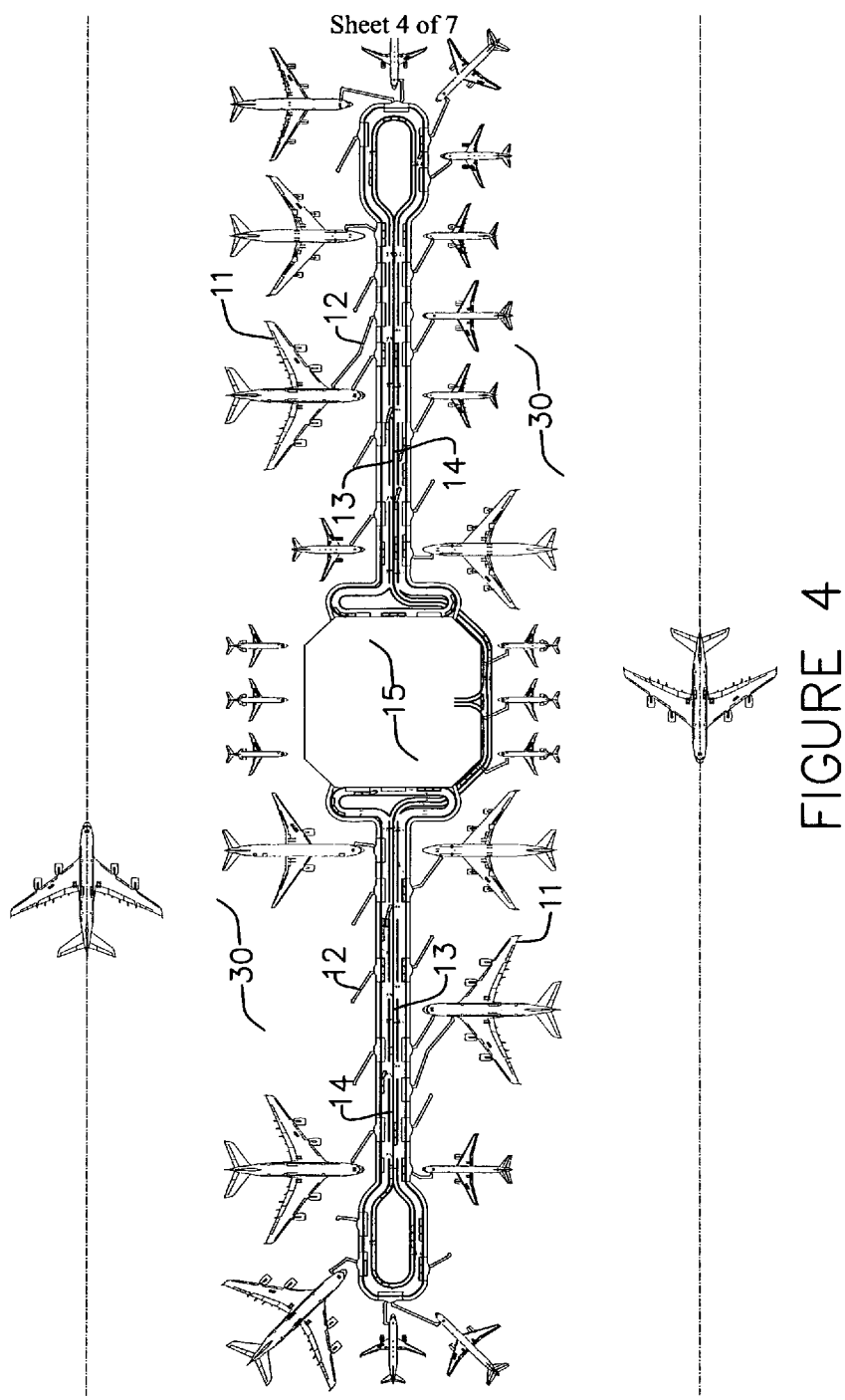
FIG. 4 is an overhead plan view of an exemplary airport concourse with an integrated PRT system according to a third embodiment.
Figure 5:
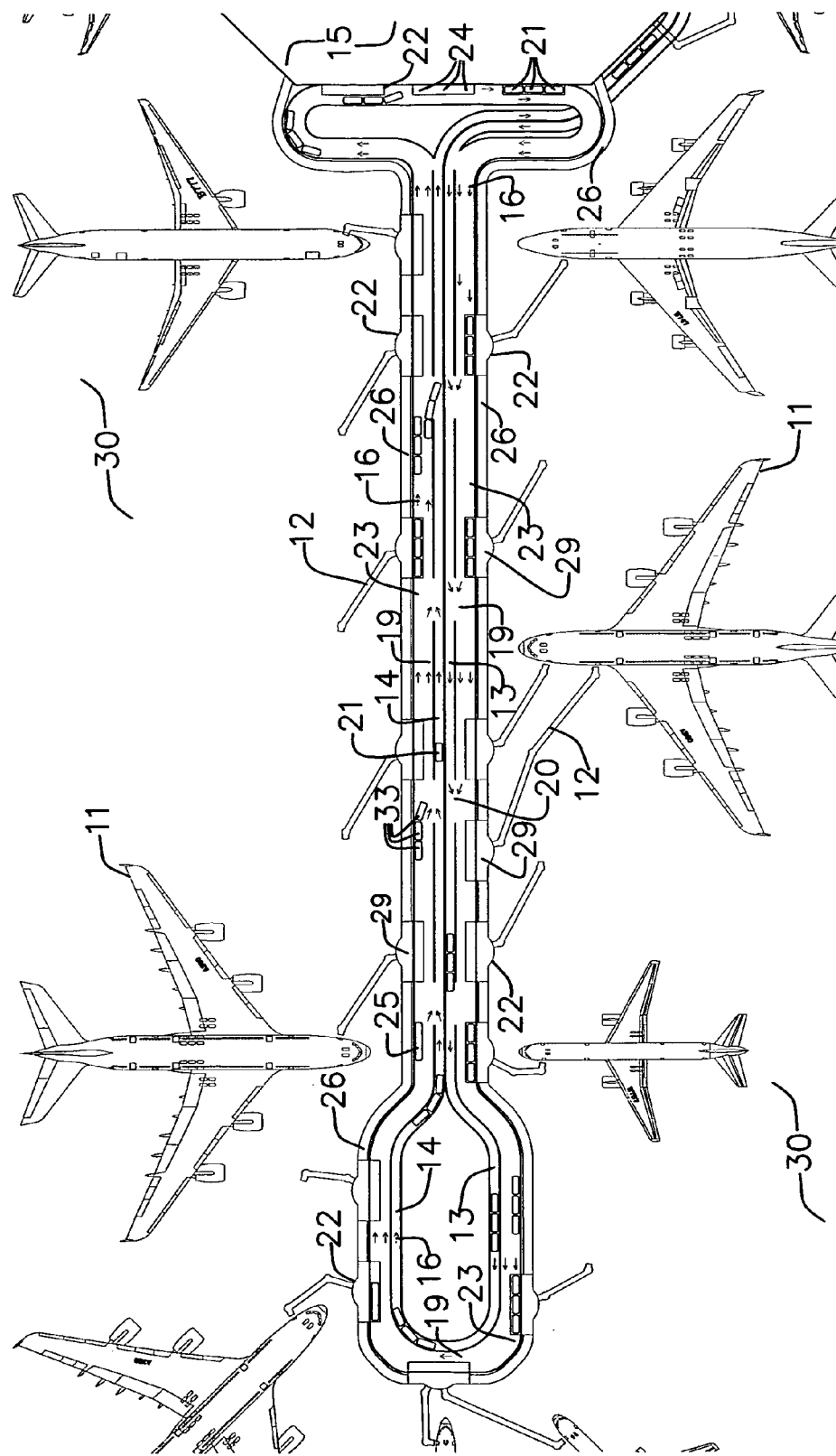
FIG. 5 is a close-up view of the third embodiment airport concourse with an integrated PRT system illustrated in FIG. 4.

A third embodiment automated terminal to aircraft conveyance system is disclosed herein with reference to FIGS. 4 and 5. FIG. 4 is an overhead plan view of an exemplary airport concourse or terminal with an integrated PRT system whereby the entire system of PRT guideways and PRT stations are approximately at one level. FIG. 4 depicts a plurality of parked aircraft (11). Some aircraft are parked at an airport concourse or terminal (15) and removably coupled to the airport concourse or terminal (15) by one or more aircraft loading bridges (12). Other aircraft can be parked away from the airport concourse or terminal (15). Outbound PRT guideways (13) lead from the airport concourse or terminal (15) out between the parked aircraft (11). The outbound PRT guideways are coupled to inbound PRT guideways (14) leading from between the parked aircraft (11) back to the airport concourse or terminal (15).

With reference now to FIG. 5, a close-up view of the third embodiment automated terminal to aircraft conveyance system focusing on an area located to one side of the concourse (15) is illustrated. The outbound PRT guideways (13) and inbound PRT guideways (14) are shown. The direction of traffic is depicted by arrows (16). PRT station guideways (23) feed into and out of PRT stations (22). Intermediate guideways (19) couple the outbound or inbound PRT guideways (13 or 14) to the PRT station guideways (23). The intermediate and station guideways (19 and 23) facilitate the acceleration and deceleration of PRT vehicles (21) as well as the short- or long-term offline storage of the PRT vehicles (21), GRT vehicles (25) or platooned vehicles (33) out of the way of other vehicles. One or more loading bridges (12) removably couple the parked aircraft (11) to PRT stations (22) located on the station guideways (23). The level of the PRT station platforms (29), station guideways (23), and outbound and inbound PRT guideways (13 and 14) is such as to facilitate walking on the loading bridges (12) connecting the aircraft sill level to the station platform level, and to facilitate the passage of PRT vehicles (21) from one guideway to another. Station bays (24) at the concourse/terminal (15) can be dedicated to serve one specific aircraft as a destination during a specific time period. Access to these bays can be controlled by the conventional check-in process currently used within airport terminal hold rooms at aircraft loading bridges, for instance. Thus, once passengers are checked through to a station bay (24), they will typically have no choice but to enter a PRT vehicle (21) and be transported to the PRT station (22) serving the one or more loading bridges (12) for their defined aircraft. Hence, instead of walking all the way to the loading bridge for final gate check-in, the passengers are checked in at a specifically designated station bay and are then transported to their aircraft boarding station and associated loading bridge.

Still referring to FIG. 5, emergency walkways (26) are typically provided for access by security and emergency personnel as well as for use by passengers in the event of a PRT system breakdown. It should be noted that the treble guideway system allows bypassing of any PRT (21) vehicle broken down and/or stuck on a guideway. In addition, a PRT vehicle (21) stuck in a station bay will affect that station only. If needed, passengers will be able to utilize the emergency walkway (26), to reach an adjoining PRT station (22) from where they can be served.

FIG. 5 illustrates the flexibility of various embodiments to accommodate a changing aircraft fleet mix whereby a parking position may be utilized by a large aircraft at one time and then two or more smaller aircraft at another. This is accomplished by providing additional strategically-located stations (22) and loading bridges (12) which may be utilized for one fleet mix but not for another.

Fourth Embodiment

Figure 6:
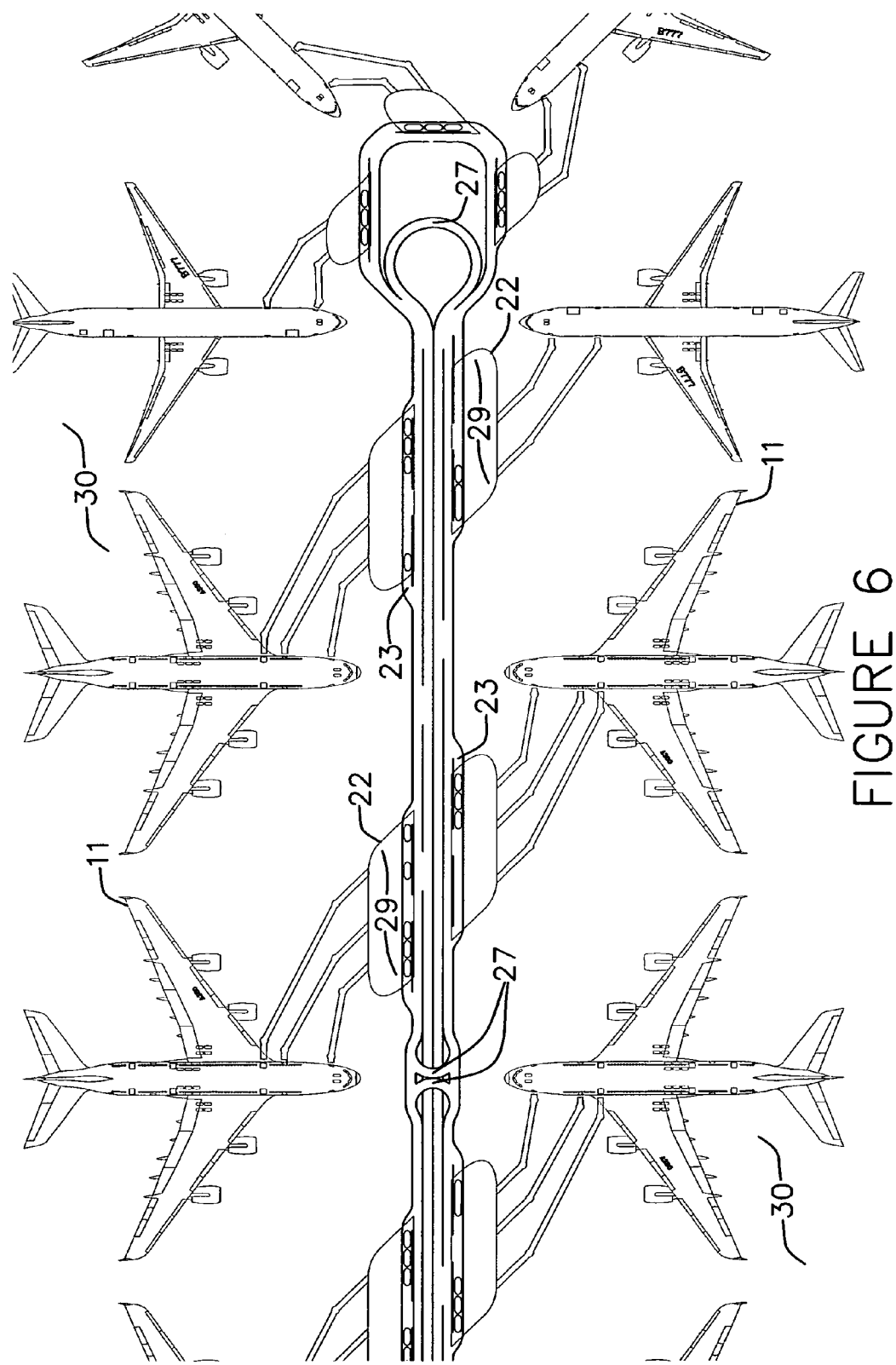
FIG. 6 is an overhead plan view of an exemplary integrated PRT system according to a fourth embodiment.

A fourth embodiment automated terminal to aircraft conveyance system is disclosed herein with reference to FIG. 6. FIG. 6 is an overhead plan view of an exemplary integrated PRT system. The layout depicted in FIG. 6 includes guideway return loops (27). These guideway return loops (27) reduce trip distances and increase the ability to maintain full service in portions of the PRT system should other portions be completely or partially shut down by an unusual occurrence such as, but not limited to, a fire. Also illustrated in FIG. 6 is a situation where extensive station guideways (23) are found not to be necessary.

Further Discussion of Embodiments

Figure 7:
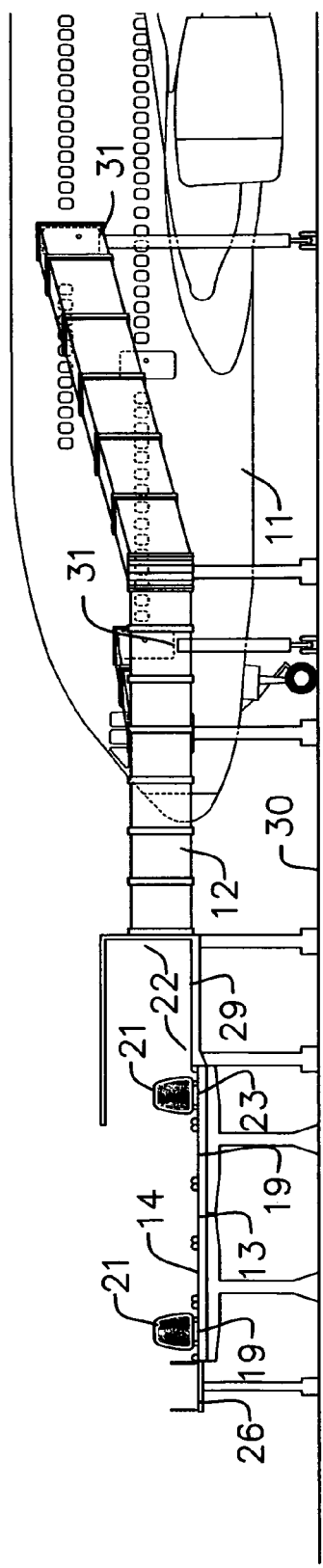
FIG. 7 is a side view of an exemplary parked aircraft elevation structure with an integrated PRT system according to an embodiment.

Now referring to FIG. 7, a side view of an exemplary aircraft loading bridge with an integrated PRT system according to an embodiment is illustrated. An elevation is illustrated showing (from left to right) an emergency walkway (26), intermediate guideway (19), inbound guideway (14), PRT vehicle (21), outbound guideway (13), intermediate guideway (19), station guideway (23), PRT vehicle (21), a station platform (29), a PRT station (22), an aircraft loading bridge (12), an aircraft parking apron (30), aircraft sill level (31) and a parked aircraft (11).

Various methods of using embodiments of automated terminal to aircraft conveyance systems are illustrated in FIGS. 1 through 7, as well as other embodiments and variations thereof as disclosed herein. Inbound passengers will typically deplane through the loading bridge and board PRT vehicles that will take them directly to a destination within the terminal building. The destination is based on the processing requirements of the arriving aircraft (e.g., baggage claim, customs, etc.). For domestic flights the destination will usually be the concourse/terminal. However, for international flights it will usually be customs. This commonality of destinations will facilitate maximizing the occupancy of each PRT vehicle, obviate the need for passengers to choose their destinations, decrease delays, and increase the PRT station throughput. Moreover, it will also ensure that connecting passengers have their boarding passes checked prior to boarding their next flight.

It is possible that some airline/airport procedures will allow arriving passengers to select from a menu of destinations and be taken directly there. This somewhat more complicated process could be facilitated by way-finding aids positioned in the loading bridge and on the station directing them to station bays serving their destinations (e.g., baggage claim" or "connecting flights").

A key aspect to embodiments of the present invention is that it combines a number of previous structures and operating characteristics in a new, unique, and unobvious way that enables aircraft to be served directly by PRT systems. It is to be appreciated that the distances to be covered by the PRT vehicles in various embodiments can be sufficiently short as to enable a high level of service to be provided by PRT vehicles moving at a relatively slow speed. This allows the PRT vehicles to travel in close proximity to one another with little danger. It also allows further speed reductions to be quickly accomplished thus minimizing the turning radii required to ensure passenger comfort. The reduced turning radii (possibly combined with a split level guideway design) enables embodiments to require a minimum amount of space.

In at least one embodiment, all PRT vehicles entering the PRT station area will typically traverse a section of double guideway in such a way that a portion of one of these guideways could be used for the temporary storage of ready PRT vehicles. This ready PRT vehicle storage area can be located upstream of a nearby station(s) and can thus quickly resupply these stations ensuring they can quickly serve deplaning passengers. The treble guideway allows PRT stations to be located on the outer station guideway while PRT vehicles can bypass stations, accelerate and decelerate, on the intermediate guideway while other vehicles can travel at a steady speed on the outbound and inbound PRT guideways. Thus, one of the unique aspects of the automated terminal to aircraft conveyance system, to provide non-stop origin-to-destination service, can be achieved. The treble guideway may not be required for small airport installations where passenger demand is relatively low and/or the PRT operation is proven to be more efficient. In such embodiments, a double guideway system may be sufficient as depicted in FIG. 1.

It is also contemplated that some embodiments of the automated terminal to aircraft conveyance system could operate satisfactorily in some instances with single guideways having only limited lengths of double guideway at each PRT station. Further, some embodiments many include a single guideway configuration (for at least a portion of the distance traveled) having an advantage in terms of cost and space. Indeed, with low demand, the requirement for station guideways may be minimal or even non-existent. As described and illustrated, PRT station configurations can be adjusted to best suit the needs of a specific airport application.

The number of bays per PRT station can be readily increased or decreased thereby making expansion significantly easier. The bays can be in line with each other as depicted in embodiments. In this configuration, following vehicles cannot bypass preceding vehicles that may be subject to longer loading/unloading times. Alternatively, the bays can be in a generally saw-tooth configuration allowing independent operation of each individual PRT vehicle as in U.S. Pat. No. 7,681,505 to Lowson et al (2010). In yet another alternative, the bays can be in line with each other with sufficient space in between the PRT vehicles to allow following vehicles to pull out and pass preceding vehicles. This alternative operation can be facilitated if PRT vehicles have multi-directional steering capability (e.g., four-wheel steering) and can "crab" in and out of station bays.

In another embodiment, the automated terminal to aircraft conveyance system can be implemented so as to facilitate use of larger vehicles with greater capacity (routinely defined in the industry as group rapid transit or GRT vehicles). These GRT vehicles will sometimes require larger turning radii which could result in such embodiments having a larger footprint but potentially retaining all other advantages while having a higher passenger handling capacity. Another variation of this inventive concept can have platoons of two or more small vehicles travelling together, for instance. These vehicle platoons would provide similar benefits as larger vehicles without needing the larger turning radii. The concept of larger vehicles and/or platoons of smaller vehicles will typically work best when passengers using the system at any given time share a few common destinations. This will facilitate the sharing of rides by those with common destinations. Whether small or large vehicles are used, the relatively small number of destinations with high demand at any one time (typical of airport operations) will facilitate high vehicle occupancies resulting in improved efficiencies.

The challenge of removably connecting the PRT stations to the aircraft door is solved by means of conventional passenger loading bridges. For example, currently available movable and extendable loading bridges can be used to allow flexibility in the parked aircraft door positions relative to the PRT stations. It should be noted that, in many regards, embodiments of the present invention act as an extended loading bridge of considerable length. Passengers will flow through the embodiments of the automated terminal to aircraft conveyance system and through the loading bridges in a continuous manner at rates similar to conventional loading bridges. Thus, the enplaning and deplaning of the aircraft themselves will not be affected by the various implementations disclosed and contemplated with the benefit of this disclosure. In addition, there will be little or no need to accommodate waiting passengers at any point between the final check-in gate and the aircraft door. In other words, the PRT stations can function primarily as pass-through areas with passengers constantly being served and almost never having to wait more than a few seconds between the time they exit the PRT vehicle and enter the aircraft loading bridge or exit the loading bridge and enter a PRT vehicle.

Now referring briefly to FIG. 3, the configuration has two loading bridges (12) and two, 3-berth PRT stations (22) per aircraft. Smaller aircraft are likely to only require one loading bridge and one PRT station per aircraft as depicted in FIGS. 1, 4 and 5. The number of berths in the stations may be increased or decreased according to demand. In addition, smaller aircraft will tend to have less space between aircraft in which to accommodate the lower level guideways. This in turn reduces the space available for up and down guideway ramps. The area required for the various embodiments can be significantly reduced by only having up and down ramps in one direction (28). PRT vehicles heading in a direction not served by up and down guideway ramps would typically be required to proceed in the direction opposite to their destination until they reached a turnaround or passed through a PRT station without stopping.

It is also pertinent to note that while the figures depict a general clockwise movement of PRT vehicles, there is nothing to prevent embodiments from being configured for a generally counter-clockwise movement of PRT vehicles or both.

Operational Practicality

The practicality of the various embodiments depends on the ability to serve surges of passengers deplaning from large aircraft and the cost of the complete PRT system in comparison with the cost of a conventional airport concourse serving the same number of aircraft parking positions. The two key aspects of capacity are station capacity and guideway capacity.

Station capacity is a function of bay capacity and the number of station bays. Experience at Heathrow Airport indicates PRT vehicles can cycle through bays at the rate of one every 30 seconds or 120 per hour if a steady supply of vehicles is available. With an average four passengers per vehicle (in vehicles with a maximum capacity of six) this results in 480 passengers per bay per hour.

Guideway capacity is a function of minimum headway or time between vehicles. At a 0.5 g deceleration rate, a 2-second headway can be achieved while meeting the stopping requirements of ANSI/ASCE/T&DI 21-05 Automated People Mover Standards Part 1 at 24 km/h (15 mph). A maximum theoretical capacity of 7,200 passengers per hour per direction per guideway is thus possible with an average of four passengers in vehicles traveling at 2-second headways.

Now considering the unloading of a very large aircraft with 550 passengers. The time taken for unloading such an aircraft can be as little as twelve minutes. This equates to a flow rate of 2,750 passengers per hour. Based on the bay capacity of 480 passengers per hour, six bays would be needed to accommodate this flow. If three such aircraft were to offload simultaneously over a period of 20 minutes, the total flow rate would be 4,950 passengers per hour per direction which equates to 69% of the theoretical guideway capacity of 7,200 passengers per hour per direction. Thus the various embodiments can be seen to have the capacity to serve very large aircraft with only one guideway in each direction if each station serving a large aircraft has at least six bays and is supplied with a continuous supply of vehicles. Note that increased capacity can be obtained by platooning PRT vehicles and/or utilizing GRT vehicles.

It has been calculated by Cornell (Feb. 20, 2012) that various embodiments can reduce the concourse or terminal (15) floor area by 47% while only requiring a PRT footprint of 53% of this reduced floor area. Since the cost of the PRT system on a footprint area basis is similar or less than the cost of a concourse or terminal (15) on the same basis, it can be seen that various embodiments can reduce facility costs by 25% or more.

Alternative Embodiments and Variations

The various embodiments and variations thereof, illustrated in the accompanying figures and/or described above, are merely exemplary and are not meant to limit the scope of the invention. It is to be appreciated that numerous other variations of the invention have been contemplated, as would be obvious to one of ordinary skill in the art, given the benefit of this disclosure. For example, boarding passes may include bar codes or other identifying means to automatically route a PRT vehicle to a specific destination.

All variations of the invention disclosed in this provisional application are intended and contemplated to be within the spirit and scope of the invention.

The invention claimed is:

1. An automated terminal to aircraft boarding system comprising:
at least one airport terminal or concourse for processing passengers,
one or more aircraft loading bridges for coupling to an aircraft for loading and unloading, and
a person rapid transit (PRT) system, said PRT system comprising:
a plurality of vehicles, a plurality of stations, guideways, station bays, station guideways, and a computer control system,
said plurality of stations including at least one first station coupled to said at least one airport terminal or concourse,
said plurality of stations including at least one second station coupled to one or more of said one or more aircraft loading bridges,
wherein the vehicles can move on said guideways and said guideways lead from said at least one first station to said at least one second station and back to said at least one first station,
wherein each of said plurality of stations is coupled to one or more station bays and said vehicles can stop in the station bays,
wherein said station guideways provide an alternate path to said station bays, thereby preventing vehicles stopped at station bays from impeding moving vehicles on the guideways, and
wherein said computer control system controls merging and diverging of said vehicles on the guideways.

2. The automated terminal to aircraft boarding device of claim 1, wherein said guideways and station guideways are arranged so as to facilitate parking of empty vehicles near stations with a high demand for said empty vehicles.

3. The automated terminal to aircraft boarding device of claim 1, having at least one station associated with a departing aircraft, wherein one or more said station bays at said airport terminal or concourse are configured so as to facilitate operatively coupling, during specific time periods, specific said bays to a specific station of said stations, whereby passengers can be processed to said specific station associated with a departing aircraft from said airport terminal or concourse.

4. The automated terminal to aircraft boarding device of claim 1, wherein ancillary facilities are also coupled to said personal rapid transit system,
whereby said passengers may be quickly and conveniently moved between said stations and said ancillary facilities.

5. The automated terminal to aircraft boarding device of claim 4, wherein goods or luggage are also transported on said personal rapid transit system.

\* \* \* \* \*